(12) United States Patent
Batcher (10) Patent No.: US 7,437,213 B2
(45) Date of Patent: Oct. 14, 2008

(54) MONITORING PERFORMANCE OF A WAREWASHER

(75) Inventor: Thomas J. Batcher, Mendota Heights, MN (US)

(73) Assignee: Ecolab Inc., Saint Paul, MN (US)

( * ) Notice: Subject to any disclaimer, the term of this patent is extended or adjusted under 35 U.S.C. 154(b) by 1016 days.

(21) Appl. No.: 10/288,352

(22) Filed: Nov. 4, 2002

(65) Prior Publication Data

US 2004/0088075 A1 May 6, 2004

(51) Int. Cl.
*G06F 7/00* (2006.01)
(52) U.S. Cl. .................... 700/225; 700/213; 700/226
(58) Field of Classification Search .............. 700/226, 700/213, 225, 228, 229, 230; 198/340, 349, 198/350; 134/56 D, 57 D, 58 D
See application file for complete search history.

(56) References Cited

U.S. PATENT DOCUMENTS

| | | |
|---|---|---|
| 3,774,056 A | 11/1973 | Sample et al. |
| 4,084,237 A | 4/1978 | Beachem et al. |
| 4,104,542 A | 8/1978 | Karklys et al. |
| 4,509,543 A | 4/1985 | Livingston et al. |
| 4,756,321 A | 7/1988 | Livingston et al. |
| 5,014,211 A | 5/1991 | Turner et al. |
| 5,038,807 A | 8/1991 | Bailey et al. |
| 5,203,366 A | 4/1993 | Czeck et al. |
| 5,222,027 A | 6/1993 | Williams et al. |
| 5,241,975 A | 9/1993 | Yanagihara |
| 5,345,379 A | 9/1994 | Brous et al. |
| 5,383,482 A | 1/1995 | Yamada et al. |

(Continued)

FOREIGN PATENT DOCUMENTS

EP WO 01/29761 A1 4/2001

(Continued)

OTHER PUBLICATIONS

Greg Dalton, The Industry Standard, *"If these Shelves Could Talk"*, Apr. 2, 2001.

(Continued)

*Primary Examiner*—Gene O. Crawford
*Assistant Examiner*—Ramya G Prakasam
(74) *Attorney, Agent, or Firm*—Shumaker & Sieffert, P.A.

(57) ABSTRACT

A method and system for collecting information associated with warewashing activities is disclosed. Articles to be cleaned by a warewasher are placed in racks designed to fit inside a wash chamber of the warewasher. Each rack is assigned a unique identifier (ID). No two racks are associated with the same unique ID. An Radio Frequency IDentification (RFID) tag is embedded within or placed on the outer shell of each rack. The RFID tag of a rack is programmed with the unique ID assigned to the rack. An RFID reader reads the unique ID of each rack as the racks are placed into the warewasher. The RFID reader transmits the unique ID to a host computer where the unique ID is stamped with a time reference, stored and eventually uploaded to a server computer. The unique ID and associated time reference are analyzed by the server computer, the host computer or a client computer connected to the server computer in order to monitor performance of the warewasher. For example, the analysis may calculate the total number of racks provided to the wash chamber over a given period in time.

37 Claims, 5 Drawing Sheets

U.S. PATENT DOCUMENTS

| | | |
|---|---|---|
| 5,388,299 A | 2/1995 | Lee |
| 5,644,936 A | 7/1997 | Yasutake et al. |
| 5,681,400 A | 10/1997 | Brady et al. |
| 5,694,323 A | 12/1997 | Koropitzer et al. |
| 5,715,555 A | 2/1998 | Reber et al. |
| 5,724,261 A | 3/1998 | Denny et al. |
| 5,743,209 A | 4/1998 | Bazin et al. |
| 5,745,381 A | 4/1998 | Tanaka et al. |
| 5,757,664 A | 5/1998 | Rogers et al. |
| 5,771,909 A | 6/1998 | Hein et al. |
| 5,777,895 A | 7/1998 | Kuroda et al. |
| 5,826,749 A | 10/1998 | Howland et al. |
| 5,839,097 A | 11/1998 | Klausner |
| 5,886,648 A | 3/1999 | McElroy et al. |
| 5,897,671 A | 4/1999 | Newman et al. |
| 5,967,202 A | 10/1999 | Mullen et al. |
| 5,975,352 A | 11/1999 | Spriggs et al. |
| 5,980,090 A | 11/1999 | Royal et al. |
| 6,061,668 A | 5/2000 | Sharrow |
| 6,112,754 A * | 9/2000 | Bradley .................... 134/57 D |
| 6,167,358 A | 12/2000 | Othmer et al. |
| 6,321,204 B1 | 11/2001 | Kazami et al. |
| 6,377,868 B1 | 4/2002 | Gardner |
| 6,463,940 B1 * | 10/2002 | Thomas et al. ............ 134/56 R |
| 6,710,891 B1 * | 3/2004 | Vraa et al. ................. 358/1.12 |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0020435 A1 | 2/2002 | Varpio |

FOREIGN PATENT DOCUMENTS

| | | | |
|---|---|---|---|
| EP | WO 01/78573 A2 | 10/2001 | |

OTHER PUBLICATIONS

BiStatix ™ Technology, *"A Whitepaper, Version 4.1"*, Motorola Inc., Worldwide Smartcard Solutions Division (publication date unknown).

Motorola—BiStatix and Answers (publication date unknown).

Motorola—BiStatix Primer (publication date unknown).

Lycos Zone™, *"How Smart Labels Will Work"*, Kevin Bonsor, Nov. 1, 2001.

Lycos Zone™, *"How Smart Labels Will Work—Talking Tags"*, Kevin Bonsor, Nov. 1, 2001.

International Search Report dated Jun. 2, 2004.

\* cited by examiner

FIG. 6

MONITORING PERFORMANCE OF A WAREWASHER

TECHNICAL FIELD

The invention relates generally to monitoring activity of a utility device, and more particularly, to collecting data from a warewasher.

BACKGROUND OF THE INVENTION

A warewasher is a utility dishwasher used in restaurants, healthcare facilities and other locations to efficiently clean and sanitize cooking and eating articles, such as, dishes, pots, pans, utensils and other cooking equipment. Articles are placed on a rack and provided to a washing chamber of the warewasher. In the chamber, water and cleaning products, e.g., detergents and soaps, are applied to the articles over a predefined period of time referred to as a "wash cycle." At the end of the wash cycle, the rack is removed from the washing chamber so that other racks carrying other articles may be moved into the washing chamber. The washing cycle is then repeated for each of these subsequent racks. Wash cycles may be customized for specific types of racks and the articles that the racks carry.

The number of articles washed by a warewasher over a given period in time may be estimated based on the number of racks provided to the warewasher during a given period in time. Currently, the number of racks provided to the warewasher during a given period in time is estimated based on the volume of chemical products used over the given period in time. This type of estimation is not very accurate because different types of articles require different amounts of chemical products. For instance, a warewasher may apply twenty ounces of a chemical product to a rack of utensils, but sixty ounces of the same chemical product to a rack of industrial pots and pans.

Another way to count racks provided to a warewasher over a given period in time is to use a mechanical counter that counts the number of times that a sliding entry door of the warewasher is opened. Each time the door is opened, the count of the counter is incremented by one. The counter is then checked by an operator to determine the number of racks provided to the warewasher over a given period in time. Although counting racks in this fashion is more accurate than counting racks based on product usage, it is not without problems. Namely, situations exist where a door of the warewasher is opened, but a rack is not washed. These situations render counts calculated by a counter somewhat inaccurate. To date, the most accurate and precise method used to count racks provided to a warewasher over a given period of time is to manually count each rack provided to the warewasher. It goes without saying that this alternative is an extreme waste of time.

SUMMARY OF THE INVENTION

In accordance with the present invention, the above and other problems are solved by a method and system for collecting information related to operation and performance of a warewasher. Articles to be cleaned by the warewasher are loaded onto racks designed to be placed in the warewasher. The racks include an identification tag that specifies a unique identifier (ID) assigned to each rack to be provided to the warewasher. The racks are provided to the warewasher one at a time. As a rack is being provided to the warewasher, a tag reader reads the unique ID specified by the identification tag. The detected unique ID is saved to a data structure resident on a host computer local to the warewasher, thereby enabling the unique ID to be used for future analysis. The collection system repeats this process for each rack provided to the warewasher during a given period of time such that the data structure is updated to include the unique ID's of all racks provided to the warewasher up to the given period of time.

The identification tag may be embedded within the molding of or affixed to the outer shell of the rack. In accordance with an embodiment, Radio Frequency IDentification (RFID) technology may be used to implement the present invention. In this embodiment, the identification tag for each rack is an RFID tag having a silicon chip programmed with the unique ID for the rack. The tag reader is positioned in or near the warewasher such that a magnetic field is created in or around the entry to the warewasher. The magnetic field generates a current in the coil of the RFID tag as the rack is provided to the warewasher. The current powers the silicon chip to provide the unique ID of that rack to the tag reader, which thereafter provides the unique ID to the host computer.

In accordance with an embodiment of the present invention, each detected unique ID is uploaded to a remote computer. The remote computer and the host computer communicate, i.e., pass data, over a network connection, such as an Internet or an Intranet. The unique ID's may be uploaded to the remote computer as the unique ID's are detected or during scheduled, or possibly even random, upload sessions. If the unique ID's are uploaded as they are detected, i.e., substantially in real-time, the host computer and the remote computer can communicate over a substantially continuous or permanent network connection. If the unique ID's are not uploaded in substantial real-time fashion, but rather during either scheduled or random upload sessions, the host computer can intermittently send the data containing detected unique ID's to the remote computer.

In accordance with yet another embodiment of the present invention, each unique ID is stamped with a time reference relative to a calendar date and clock time as the unique ID is received by the host computer. The detected unique ID's may be analyzed by either the host computer or the remote computer to monitor operation and performance of the warewasher over a predetermined period of time. For example, the unique ID's may be used to calculate the total number of racks provided to the warewasher over the predetermined period of time. Additionally, the unique ID of a particular rack may be used to calculate the number of instances that the rack has been provided to the warewasher over the predetermined period of time. Because no two racks as assigned the same ID within a given system, the unique ID may be analyzed by the host or remote computer to provide a report as to the type of articles washed by the warewasher at a particular time. Similarly, the host or remote computer may analyze a detected unique ID to define patterns of wash cycles used for specific types of articles.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

The present invention and its various embodiments are described in detail below with reference to the figures. When referring to the figures, like structures and elements shown throughout are indicated with like reference numerals.

The present invention provides a method and system for monitoring operations of a cleaning apparatus to collect information associated with article racks sent through the apparatus. The cleaning apparatus is described below as being a commercial dishwasher, which is also referred to as a warewasher. However, it should be appreciated that the cleaning apparatus may be any type of utility device that cleans articles provided thereto on racks.

Figure 1:
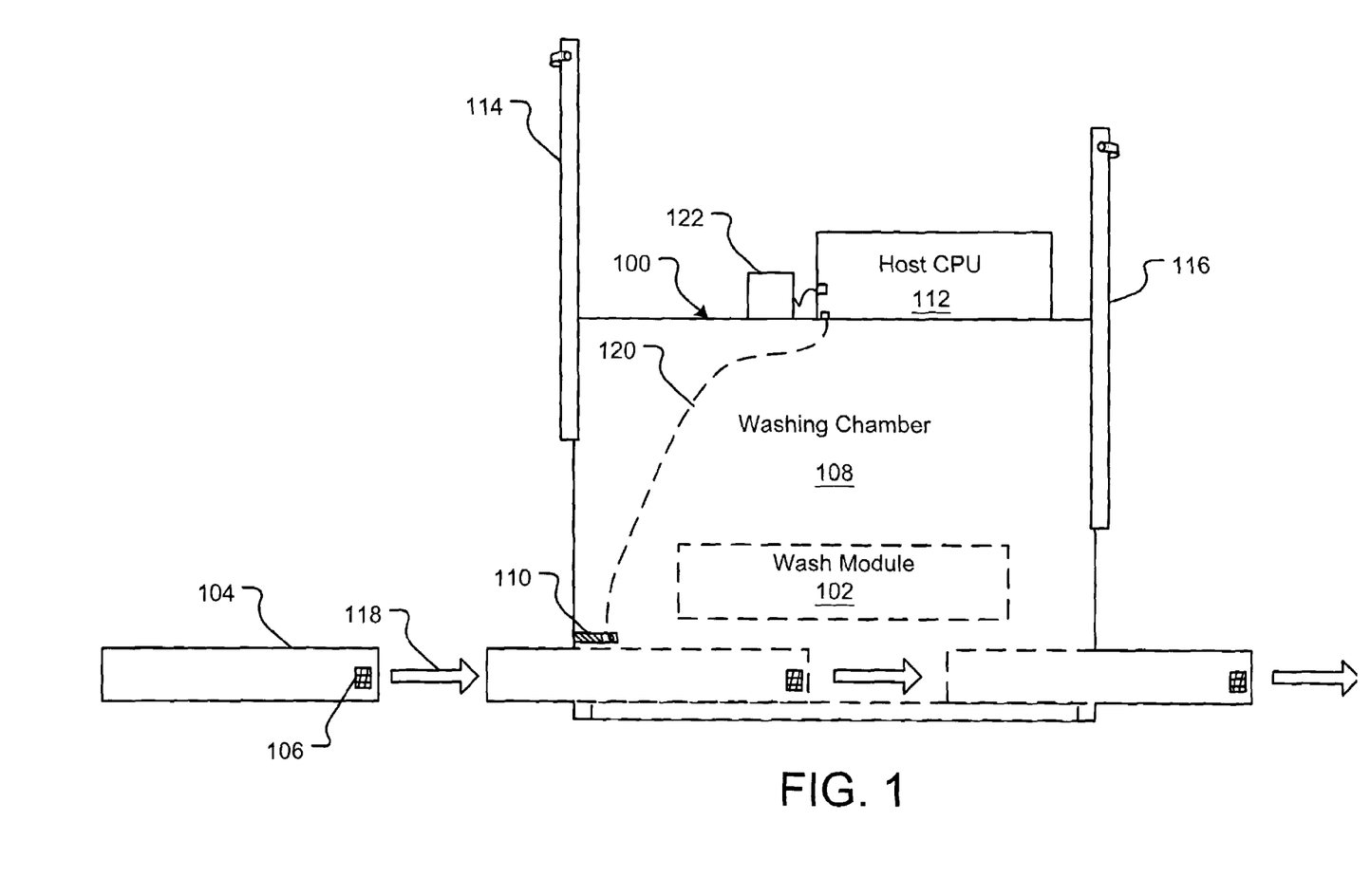
FIG. 1 illustrates components of a cleaning apparatus in accordance with an embodiment of the present invention.

Referring now to FIG. 1, a warewasher 100 is shown in accordance with an embodiment of the present invention. The warewasher 100 is used to clean all types of dishware and kitchen utensils, such as, without limitation, pots and pans used in restaurants and bakeries. Objects washed by the warewasher are hereinafter referred to as articles. The warewasher 100 may be a commercial dump or fill type dish machine with a standard dish rack, although other cleaning apparatuses may be employed, including, without limitation, animal cage washers used in animal research areas.

The warewasher 100 includes a washing chamber 108, which, in the embodiment shown may be closed by an entry sliding door 114 and an exit sliding door 116. In operation, each article rack 104 carries one or more articles to be washed by the warewasher 100 into the washing chamber 108 through an opened entry sliding door 114. Arrows 118, which are provided in FIG. 1 for illustration purposes only, show the direction of racks 104 through the washing chamber 108 in accordance with an embodiment of the present invention. Once a rack 104 is located inside the washing chamber 108, the entry sliding door 114 and the exit sliding door 116 are both closed to fully contain the washing chamber 108 on all sides.

A wash module 102 is provided within the washing chamber 108 for applying water and chemical products, e.g., detergents, etc., to articles placed in the racks 104. The wash module 102 includes an internal processor for controlling wash operations, e.g., type and amount of chemical product used, length of wash session, etc., for each rack 104 that enters the washing chamber 108. Operation of the wash module 102 commences after both the entry sliding door 114 and the exit sliding door 116 are closed with a rack 104 being located substantially underneath the wash module 102. Following completion of a wash cycle for a particular rack 104, the exit sliding door 116 is opened such that the rack 104 may be removed from the washing chamber 108 to make the warewasher 100 available for use by subsequent article racks 104.

In accordance with an embodiment, the present invention provides a system for monitoring washing operations of the ware washer 100 in order to collect information related to racks 104 that are placed into the washing chamber 108 over a given period of time. Each rack 104 that is to carry articles into the washing chamber 108 is assigned a unique identifier (ID). Each unique ID is specific to a single rack 104 in that no two racks 104 are assigned the same unique ID. An identification tag 106 indicative of the unique ID for each rack 104 is positioned on the outer shell or within the molding of each rack 104.

Although shown in FIG. 1 as being located at the front of a rack 104, the identification tag 106 may be positioned anywhere on or in the rack 104. A tag reader 110 is positioned on the warewasher 100 at a location sufficient for detecting the identification tag 106 and reading the unique ID as each rack 104 is provided to the washing chamber 108. Although shown in FIG. 1 as being located inside the washing chamber 108 near the entry sliding door 114, the tag reader 110 may be positioned anywhere on or in the warewasher 100.

The tag reader 110 is connected to a host computer 112 by a communication path 120. Although shown as current-carrying wires, the communication path 120 may also be based on wireless communication technology. Upon detection of an identification tag 106, the tag reader 110 transmits a signal containing the unique ID of the rack 104 to the host computer 112 by way of the communication path 120. The host computer 112 time stamps the unique ID with calendar date and clock information such that the unique ID, and thus corresponding rack 104, is associated with a particular time reference respective to each other rack 104 provided to the washing chamber 108. The unique ID and time reference, which includes both the calendar date and clock information, are saved to a data structure, e.g., a data file, stored on the host computer 112. The data structure is a compilation of unique ID's and time references for all instances of racks 104 sent through the washing chamber 108. In an embodiment, an instance is broadly defined as placement of a rack 104 into the washing chamber 108 of the warewasher 100. Table 1, below, is an illustration of an exemplary data structure in which the above-noted information is saved in tabular form.

TABLE 1

| Date | Time | Unique ID |
|---|---|---|
| Jan. 18, 2002 | 07:30:45 | 50150E6730 |
| Jan. 18, 2002 | 07:31:20 | 50151E1342 |
| Jan. 18, 2002 | 07:31:40 | 50151B2509 |
| Jan. 18, 2002 | 07:32:10 | 50151D2D24 |
| Jan. 18, 2002 | 07:32:30 | 50151A2452 |

In accordance with an embodiment, the host computer 112 is connected to a communication device 122 for uploading collected and generated information, e.g., unique ID's and corresponding time references, to a remote computer, or central server, (not shown in FIG. 1; 426 in FIG. 4) over a network connection. The communication device 122 may be any type of device used to transmit data from a local computer, such as the host computer 112, to a remote computer over the network connection. For instance, the communication device 122 may be a modem, a network interface card (NIC) alone or in combination with a router, hub or Ethernet port, a wireless transmitter, etc. The host computer 112 connects to the remote computer using the communication device 122, and once connected, transmits the data structure over the connection to the remote computer. The data structure is used by the central server to update a database to include the recently collected information. Once updated, the information stored in the database may be processed by the remote computer or other remote computers to render conclusions regarding the quantity of racks 104 sent through the warewasher 100 as well as the frequency of use of each specific rack 104.

Figure 2:
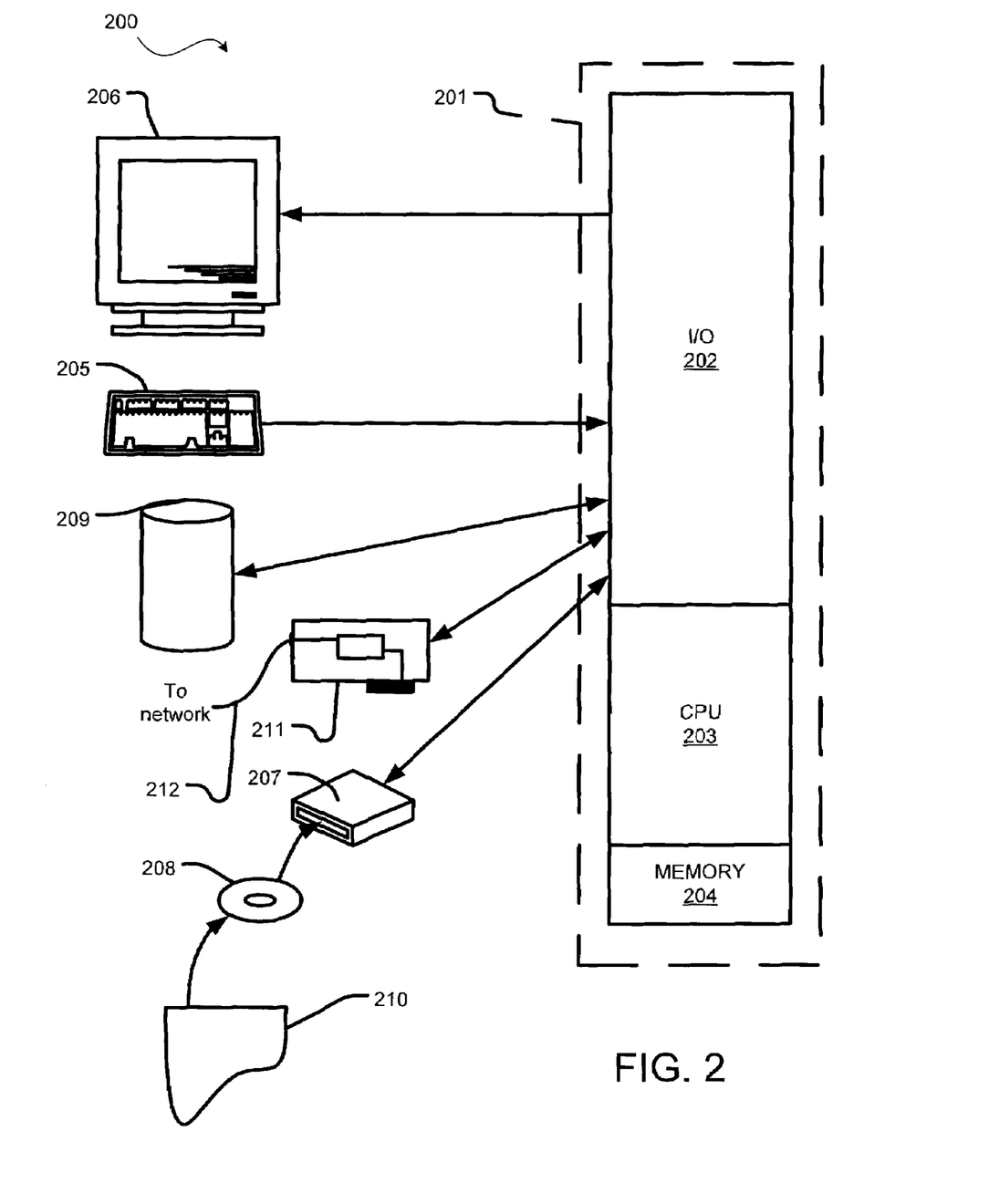
FIG. 2 depicts a general-purpose computer that implements logical operations of an embodiment of the present invention.

FIG. 2 depicts a general-purpose computing system 200 capable of executing a program product embodiment of the present invention. One operating environment in which the present invention is potentially useful encompasses the general-purpose computing system 200, such as, for example, the host computer 112 and the remote computer to which collected information is uploaded. In such a system, data and program files may be input to the computing system 200, which reads the files and executes the programs therein. Some of the elements of a general-purpose computing system 200 are shown in FIG. 2 wherein a processor 201 is shown having an input/output (I/O) section 202, a Central Processing Unit (CPU) 203, and a memory section 204. The present invention is optionally implemented in software devices loaded in memory 204 and/or stored on a configured CD-ROM 208 or storage unit 209 thereby transforming the computing system 200 to a special purpose machine for implementing the present invention.

The I/O section 202 is connected to a keyboard 205, a display unit 206, a disk storage unit 209, and a disk drive unit 207. In accordance with one embodiment, the disk drive unit 207 is a CD-ROM driver unit capable of reading the CD-ROM medium 208, which typically contains programs 210 and data. Computer program products containing mechanisms to effectuate the systems and methods in accordance with the present invention may reside in the memory section 204, the disk storage unit 209, or the CD-ROM medium 208 of such a system. In accordance with an alternative embodiment, the disk drive unit 207 may be replaced or supplemented by a floppy drive unit, a tape drive unit, or other storage medium drive unit. A network adapter 211 is capable of connecting the computing system 200 to a network of remote computers via a network link 212. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 200. Logical connections may include a local area network (LAN) or a wide area network (WAN). Such networking environments are commonplace in offices, enterprise-wide computer networks, intranets, and the Internet.

In accordance with a program product embodiment of the present invention, software instructions, such as instructions directed toward communicating data between a client and a server, detecting product usage data, analyzing data, and generating reports, may be executed by the CPU 203; and data, such as products usage data, corporate data, and supplemental data generated from product usage data or input from other sources, may be stored in memory section 204, or on the disk storage unit 209, the disk drive unit 207 or other storage medium units coupled to the system 200.

As is familiar to those skilled in the art, the computing system 200 further comprises an operating system and usually one or more application programs. The operating system comprises a set of programs that control operations of the computing system 200 and allocation of resources. The set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system may employ a graphical user interface wherein the display output of an application program is presented in a rectangular area on the screen of the display device 206. The operating system is operable to multitask, i.e., execute computing tasks in multiple threads, and thus may be any of the following: Microsoft Corporation's "WINDOWS 95," "WINDOWS CE," "WINDOWS 98," "WINDOWS 2000" or "WINDOWS NT" operating systems, IBM's OS/2 WARP, Apple's MACINTOSH SYSTEM 8 operating system, X-windows, etc.

In accordance with the practices of persons skilled in the art of computer programming, the present invention is described below with reference to acts and symbolic representations of operations that are performed by the computing system 200, a separate storage controller or a separate tape drive (not shown), unless indicated otherwise. Such acts and operations are sometimes referred to as being computer-executed. It will be appreciated that the acts and symbolically represented operations include the manipulations by the CPU 203 of electrical signals representing data bits causing a transformation or reduction of the electrical signal representation, and the maintenance of data bits at memory locations in the memory 204, the configured CD-ROM 208 or the storage unit 209 to thereby reconfigure or otherwise alter the operation of the computing system 200, as well as other processing signals. The memory locations where data bits are maintained are physical locations that have particular electrical, magnetic, or optical properties corresponding to the data bits.

The logical operations of the various embodiments of the present invention are implemented either manually and/or (1) as a sequence of computer-implemented steps running on a computing system, e.g., host computer 112 and server computer 426, and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figures 3A, 3B:
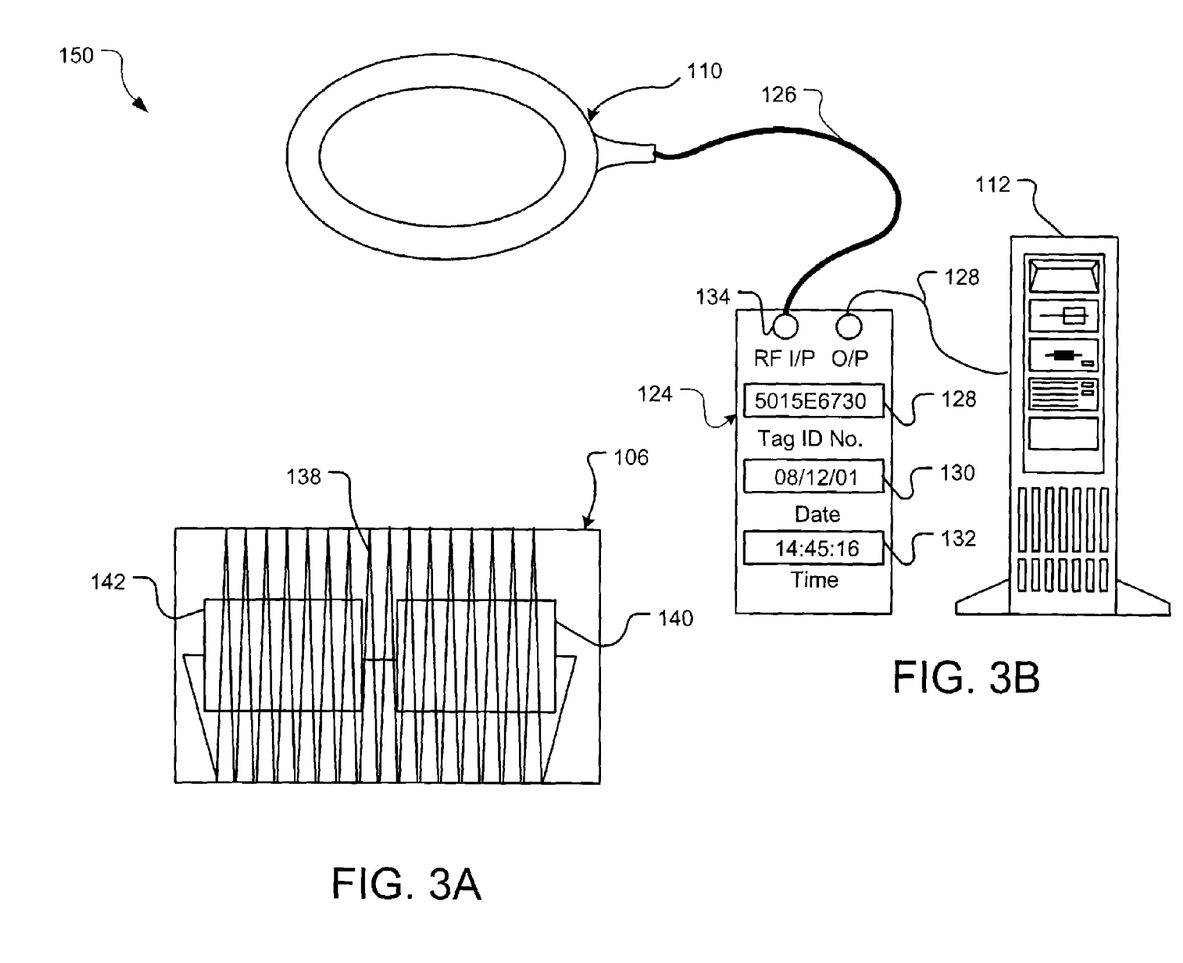
FIG. 3A illustrates an identification tag used to uniquely identify racks placed into the cleaning apparatus of FIG. 1 in accordance with an embodiment of the present invention.
FIG. 3B illustrates a system for collecting information from the identification tag of FIG. 3A.

FIGS. 3A and 3B illustrate one possible embodiment of a system for collecting information associated with racks 104 being provided to the washing chamber 108 of the warewasher 100. In this embodiment, the identification tag 106 is a Radio Frequency Identification (RFID) tag, as illustrated in FIG. 3A, and the tag reader 110 is an RFID tag reader, as illustrated in FIG. 3B. Because the RFID tag 106 and the RFID tag reader 110 work together as described below to collect information, i.e., unique ID's, associated with racks 104 sent through the washing chamber 108, these components collectively make up an "RFID system 150." The RFID system 150, the host computer 112 and the communication device 122 are broadly and collectively referred to herein as a "collection system."

The RFID tag reader 110 is optionally coupled to a display module 124 by a first communication path 126 in accordance with an embodiment of the present invention. Information is gathered by the tag reader 110 and provided to the display module 124 at the input port 134. The display module 124 timestamps the unique ID received as each identification tag 106 is detected and presents both the unique ID and corresponding time reference on an ID display 128, a calendar date display 130 and a time display 132. In this embodiment, the unique ID and time reference for each detected identification tag 106 are provided to the host computer 112 by the display module 124 over a second communication path 128. Once this information is received, the host computer 112 updates the data structure as described above with reference to FIG. 1.

In another embodiment, a display module 124 and second communication path 128 are not used, but rather information is carried from the RFID tag reader 110 directly to the host computer 112 by the first communication path 126. In this embodiment, the host computer 112 is provided with an application program for receiving and time stamping unique ID's of detected identification tags 106. Once time-stamped, each unique ID and corresponding time reference is automatically saved in the data structure. The host computer 112 may include a display monitor (not shown) for locally presenting the collected unique ID's and associated time references on a graphical user interface (GUI) of the application program.

In one possible embodiment, the RFID tag 106 includes a coil 138, a capacitor 140 and a programmable silicon chip 142. The programmable silicon chip 142 is programmed with the unique ID assigned to the rack 104 to which the tag 106 is associated. The coil 138 and the capacitor 140 form a resonant tank circuit within the RFID tag 106. RFID technology is based on inductive principles wherein electromotive force is generated in the resonant tank circuit responsive to a magnetic flux being applied thereto. Various types of information, and not just the appropriate unique ID, may be written to and read from the programmable silicon chip 142. For example, without limitation, the programmable silicon chip 142 can store the number on times a tagged rack 104 has been detected, and therefore read, by the tag reader 110. Also, without limitation, a count register programmed into the silicon chip 142 may be incremented, or alternatively decremented, one count each time the chip 142 is read. This is accomplished by the tag reader 110 sending a write command back to the chip 142 each time the tag reader 110 detects, and thus reads the unique ID from, the chip 142.

In accordance with an embodiment, the RFID tag reader 110 constantly defines a magnetic field at a predetermined frequency over the entry point into the washing chamber 108. As each RFID tag 106 enters the magnetic field, a current is formed in the coil 138 that provides power to the programmable silicon chip 142. The chip 142 modulates the magnetic field thereby transmitting the unique ID of the RFID tag 106 back to the RFID tag reader 110. The unique ID is then sent from the RFID tag reader 110 to the host computer 112 over the first communication path 126 either directly or indirectly by way of the display module 124. BiStatix Technology™, a new RFID technology currently under development at Motorola, Inc., may be used to implement the RFID system 150 illustrated in FIGS. 3A and 3B. In contrast to conventional RFID, BiStatix Technology™ is built on capacitive coupling principles rather than inductive principles.

Figure 4:
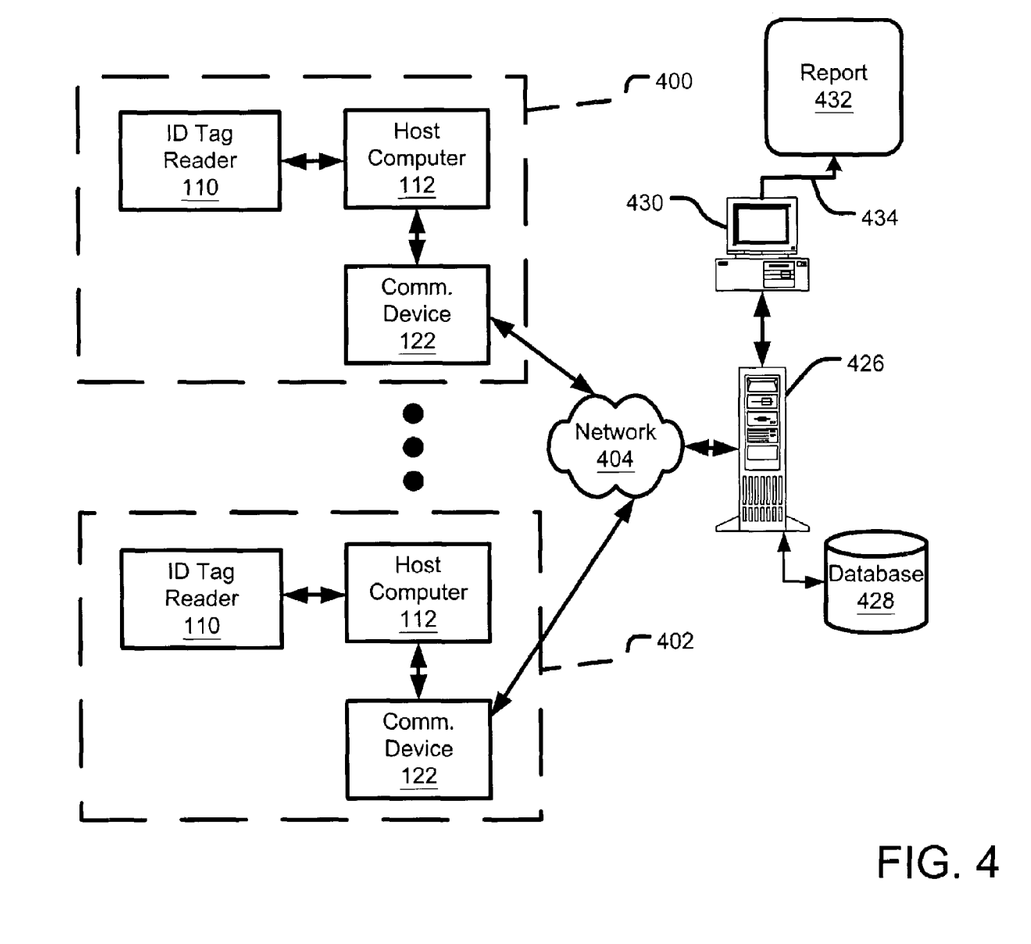
FIG. 4 illustrates an exemplary communications network wherein the cleaning apparatus of FIG. 1 is connected to a server computer in accordance with an embodiment of the present invention.

FIG. 4 illustrates an exemplary communications network including collection systems 400 and 402 connected to a remote, or "server," computer 426 in accordance with an embodiment of the present invention. Each collection system, e.g., 400 and 402, monitors racks 104 provided to a washing chamber 108 of a specific warewasher 100 in order to collect identifying information, i.e., a unique ID, associated with each rack 104. Each collection system, e.g., 400 and 402, includes a tag reader 110 for reading identification tags 106 associated with racks 104 washed by the warewasher 100, a host computer 112 for time stamping and storing information read by the tag reader 110, and a communication device 122 for transmitting information, i.e., unique ID's, read by the tag reader 110, and in one embodiment, information generated by the host computer 112, to the server computer 426.

Generally, the server computer 426 monitors operations of various warewashers 100, each having a collection system, e.g., 400 and 402, as shown in FIG. 4. For clarity, the communications network is shown in FIG. 4 as having two collection systems 400 and 402 connected to the server computer 426 over the network 404. However, it should be appreciated that the server computer 426 receives data from any number of collection systems, e.g., 400 and 402, each associated with a particular warewasher 100. Although FIG. 4 illustrates individual collection systems, e.g., 400 and 402, for each warewasher 100, in other embodiments, multiple warewashers 100 may be coupled to a single collection system, e.g., 400 and 402, and a single communications device 122 may be used to communicate data from multiple warewashers 100 to the server computer 426. Indeed, in one possible embodiment, the host computer 112 may be connected to multiple tag readers 110, wherein each tag reader 110 is associated with a different warewasher 100.

In accordance with an embodiment, each warewasher 100 and the racks 104 that are provided to that warewasher 100 are associated with a customer account. The customer account is used to categorize each warewasher 100 as belonging to or being operated by a certain customer. Such categorization is helpful when analyzing operational aspects of a warewasher 100, such as, without limitation, efficiency and customer patterns, at the server computer 426. For example, the total number of collected unique ID's for a particular warewasher 100 over a given period of time defines the number of racks 104 that have been provided to, and therefore washed by, that warewasher 100. This type of information may be used, for example, to generate an efficiency study for the warewasher 100, or possibly, to build an invoice for the customer. It should be understood that one or more warewashers 100 may be associated with a single customer account.

In an embodiment of the present invention shown in the collection systems 400 and 402, the host computer 112 includes a processor (not shown), a data collection application program (not shown) and a storage medium (not shown). The processor executes the data collection application program to associate each unique ID read by the tag reader 110 and sent to the host computer 112 with a time reference, including, without limitation, calendar date and clock information. Each unique ID and its associated time reference are stored on the storage medium as a data structure, i.e., data file. The storage medium may be a semiconductor memory device or a magnetic or optical storage device, for temporarily storing each unique ID collected by the tag reader 110 along with the corresponding time reference. However, the storage medium may be omitted in an alternative embodiment, particularly if generally continuous communication of unique ID's and corresponding time references is made to a remote database 428 or storage medium.

The communications device 122 is coupled to the host computer 112 to access data received and stored by the host computer 112, including unique ID's and corresponding time references. The communications device 122 may be programmed to access the communications network 404, preferably by a LAN (local area network), WAN (wide area network), a dial-up connection, or another well-known network connection.

In an embodiment of the present invention, the communications device 112 periodically accesses the server computer 426 to provide data, e.g., detected unique ID's and associated time references, for storage in the database 428. As such, the communications device 112 may access real-time data received by the host computer 112 and any historical data stored on a local storage medium for transfer to the database 428. In an alternative embodiment, the communications device 112 maintains communications with the server computer 426 over the communications network 404 continually; therefore, the local storage medium is unnecessary for storing detected data. Instead, the communications device 112 continually transmits real-time data to the server computer 426. As such, the server computer 426 may perform the time-stamping operations described above as being performed by the host computer 112. The detected unique ID's are therefore received by the host computer 112 and passed directly to the server computer 426, which associates each detected unique ID with a time reference prior to recording the unique ID to the database 428. The unique ID's and associated time references are thereafter both stored in the database 428 until accessed by the server computer 426. In this embodiment, a small cache device may nevertheless be employed to accommodate network congestion or other communication delays at the communications device 112.

The communications device 112 can also receive commands via the communications network 404 to provide a feedback loop to the warewasher 100. These commands are transferred to the host computer 112, which may be used to control processes and operations of the warewasher 100. Such commands may include formula updates for chemical concentrates and detergents used by the warewasher 100 to clean articles, calibration commands, test commands, alarm commands, interactive communications between the warewasher operator or service technician and the server computer facility, and other remote control commands. This capability facilitates the management of multiple, geographically dispersed warewashers 100 by allowing the operator or the service technician to distribute control commands from a central location via the communications network 404.

A client computer 430, e.g., a thick or thin client, is connected to the server computer 426 by way of communication link 434. The client 430 initiates an analysis application resident on the client computer 430 or resident on the server computer 426 to generate reports, such as report 432 providing analysis of data recorded in the database 428. The database 428 includes the unique ID's and time references provided to the server computer 426 by collection systems 400 and 402 over the network 404. As such, report 432 may include, for example, results from an efficiency analysis related to the number of racks sent through a particular warewasher 100 over a given period of time. In accordance with one possible embodiment, the report 432 may include a listing of all racks 104 sent through a particular warewasher 100 over a given period of time along with the type of rack and/or other features, e.g., model number, number of compartments, etc., associated with the racks 104. Such features may be determined by the analysis application based on the unique ID assigned to each rack 104. Table 2, below, illustrates a report 432 in accordance with this embodiment.

TABLE 2

| Date | Time | ID | Rack Type | Rack Model # | Compartments |
|---|---|---|---|---|---|
| Jan. 18, 2002 | 07:30:45 | 50150E6730 | Glass/StemWare | 6326-S1 | 36 |
| Jan. 18, 2002 | 07:31:20 | 50151E1342 | Glass/StemWare | 6326-S | 36 |
| Jan. 18, 2002 | 07:31:40 | 50151B2509 | Glass/StemWare | 6316 | 36 |
| Jan. 18, 2002 | 07:32:10 | 50151D2D24 | Plate/Tray | 5020-M | 8 Rows |
| Jan. 18, 2002 | 07:32:30 | 50151A2452 | Flatware/Utensil | 6411-M | N/A |

Figure 5:
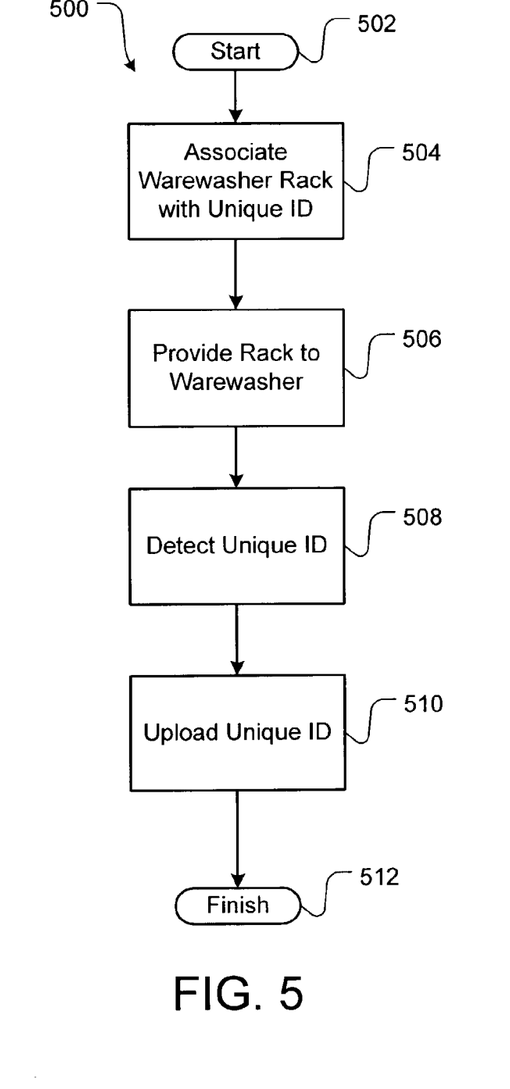
FIG. 5 is a flow diagram that illustrates operational characteristics for monitoring processes of the cleaning apparatus of FIG. 1 in accordance with an embodiment of the present invention.

With the computing environment of FIG. 2 in mind, FIG. 5 generally illustrates a process 500 for collecting information related to warewashing operations is shown in accordance with an embodiment of the present invention. The collection process 500 is performed by a flow of operations, i.e., "operation flow," beginning with a start operation 502 and concluding with a terminate operation 512. For simplicity, the collection process 500 is described below as collecting data from a single rack 104 provided to a washing chamber 108 of a warewasher 100. However, the collection process 500 may be used to simultaneously or sequentially collect information associated with numerous racks 104 provided to the washing chamber 108.

Once initiated, the operation flow passes from the start operation 502 to an association operation 504. In the association operation 504, the rack 104 is assigned a unique ID. After the rack 104 is assigned the unique ID, the rack 104 is labeled with an identification tag 106 that externally associates the rack 104 with the unique ID. In accordance with an embodiment described in FIGS. 3A and 3B, the unique ID is programmed into a silicon chip 142 of an RFID tag 106. In accordance with various other embodiments, the unique ID may be included on a bar code tag or represented on a label or tag in some other optical manner. Programming the unique ID into an RFID tag 106, however, allows the unique ID to be detected even though the tag 106 may be covered by dirt or some other inanimate object. For this reason, it is desirable to use an RFID tag 106 to associate the rack 104 with its assigned unique ID. After the rack 104 is assigned a unique ID, and after the rack 104 is, in some fashion, labeled with the unique ID, the operation flow passes to a wash operation 506.

In the wash operation 506, the rack 104 is provided to the washing chamber 108 of the warewasher 100 for cleaning and/or sanitation of the articles contained therein. From the wash operation 506, the operation flow passes to a detection operation 508. The detection operation 508 detects the unique ID assigned to the rack 104 and saves the unique ID for subsequent processing. If, as described in an embodiment above, the unique ID is programmed into an RFID tag 106, an RFID tag reader 110 is used to collect the unique ID assigned to the rack 104.

From the detection operation 508, the operation flow passes to an upload operation 510. The upload operation 510 uploads the detected unique ID to a remote computer, such as the server computer 426, for storage, computation and/or processing of the unique ID. From the upload operation 510, the operation flow concludes at the terminate operation 512.

Once stored in a database of the remote computer, each collected unique ID is accessible to an analysis application program such that the program may perform analyses and create reports associated with the warewasher 100 as well as each rack 104 that is placed into the washing chamber 108 of the warewasher 100. For example, the analysis application program may compute the number of racks 104 washed by the warewasher 100 over a given period of time. Furthermore, the analysis application program may create a report illustrative of various features, i.e., model number, type of rack, etc., of a particular rack 104 subject to the collection process 500.

Figure 6:
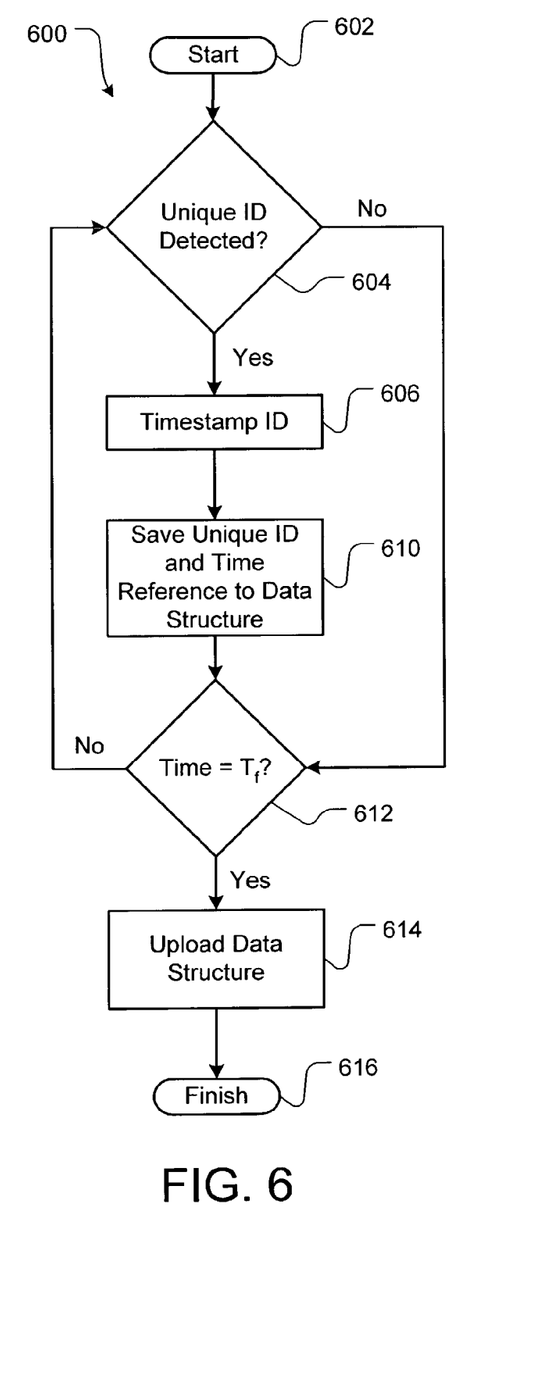
FIG. 6 is a flow diagram that illustrates operational characteristics shown in FIG. 5 in more detail in accordance with an embodiment of the present invention.

It is often desirable to associate each collected unique ID with a time reference representing a point in time when each rack 104 is placed into a washing chamber 108 of a particular warewasher 100. FIG. 6 illustrates a process for collecting identification information associated with various uniquely identified racks 104 placed into a washing chamber 108 of a warewasher 100 during a predetermined time period ($T_f$-$T_i$). During the predetermined time period ($T_f$-$T_i$), unique ID's of racks 104 placed into the washing chamber 108 are to be collected and saved locally by the host computer 112 for subsequent transfer to a remote computer, such as the server computer 426. The collection process 600 is performed by an operation flow beginning with a start operation 602 and concluding with a terminate operation 616. The start operation 602 is initiated at the beginning of a predetermined time period—time $T_i$. The predetermined time period concludes at time $T_f$.

At time $T_i$, the operation flow passes to a first query operation 604. The first query operation 604 checks to see if the tag reader 110 has detected a unique ID assigned to a rack 104 currently being placed or already located within the washing chamber 108. Upon detection, the unique ID is forwarded to the host computer 112 and the operation flow passes to a time stamp operation 606. The time stamp operation 606 stamps the unique ID with a time reference including calendar date and clock information relative to the time that the unique ID was collected. From the time stamp operation 606, the operation flow passes to a record operation 610.

The record operation 610 saves the detected unique ID and corresponding time reference to a data structure stored in the host computer 112. The data structure is stored in a database either residing in or coupled to the host computer 112. The data structure is stored in the database until the end of the predetermined time period, i.e., $T_f$, at which time the data structure is uploaded to a remote computer for storage and future analysis of the information.

If a unique ID was not detected by the first query operation 604, or, alternatively, following the record operation 610, the operation flow passes to a second query operation 612. The second query operation 612 determines whether the predetermined time period ($T_f$-$T_i$) has lapsed. The predetermined time period ($T_f$-$T_i$) lapses at time $T_f$. If the predetermined time period ($T_f$-$T_i$) has not lapsed, the operation flow returns to the first query operation 604 and continues as previously described. At time $T_f$, the operation flow passes to an upload operation 614. The upload operation 614 uploads the data structure, and thus the unique ID's and corresponding time references contained therein, to a remote computer, e.g., the server computer 426. The remote computer stores the information in a database, e.g., database 428, so that the information is available for future analysis. From the upload operation 614, the operation flow concludes at the terminate operation 616. Future iterations of the collection process 600 update the database, e.g., database 428, such that operations performed by the warewasher 100 may be continuously evaluated from a remote location.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, although racks 104 are labeled with unique ID's using RFID technology, other forms of identification may be used, such as, without limitation, bar code labels and other forms of optical character/number labeling, etc. Also, in an embodiment, the warewasher 100 may be a conveyor style warewasher. With conveyor style warewashers, the entry (114) and exit (116) sliding doors are generally plastic curtains. The racks 104 ride on a conveyor and "brush" their way through the entry and exit curtains. The curtains act as splash guards such that the wash and rinse spray does not escape through the entrance and exit ways of the machine. In accordance with yet another embodiment, the warewasher 100 may be a flight style warewasher. Flight style warewashers do not incorporate standard dish racks 104. Rather, articles, e.g., dishes, utensils, etc., are placed on a conveyor belt that has "fingers" holding the articles in place. In this embodiment, each article is labeled with an identification tag 106.

Furthermore, the present invention is broadly described herein as a system and method that enables remote evaluation of performance and operation of a warewasher 100 based on locally collected data associated with uniquely identified racks 104 placed into the warewasher 100. However, one possible embodiment of the invention enables local evaluation of the warewasher 100 at the host computer 112. In this embodiment, the host computer 112 includes an analysis application program and a display device. The analysis application program processes the collected unique ID's and corresponding time references to render a report 432 associated with warewashing operations and rack loading operations of the warewasher 100. This report 432 is presented on the display device.

Additionally, the type and amount of chemical product(s) applied to a rack 104 may be controlled based on the unique ID assigned to each rack 104 in accordance with a possible embodiment of the present invention. A method for washing a particular type of article by associated pre-determined cleaning products and/or instructions is disclosed in pending U.S. patent application, Ser. No. 09/548,573, which is assigned to the assignee of this application and incorporated into this application by reference. Numerous other changes may be made and embodiments implemented which will readily suggest themselves to those skilled in the art and which are encompassed in the spirit of the invention disclosed and as defined in the appended claims.

What is claimed is:

1. A method for monitoring operations of a warewasher over a predetermined period of time, wherein one or more racks are used to carry one or more articles through the warewasher, the method comprising:

associating a unique identifier (ID) to each rack used to carry one or more articles through the warewasher, wherein each rack comprises an identification tag specifying the unique ID assigned to that rack;

reading a unique ID assigned to a first rack as an identification tag of the first rack is detected while the first rack is being provided to the warewasher; and communicating the unique ID assigned to the first rack to a remote computer for storage in a database in association with a time reference indicative of a time at which the first rack was detected while being provided to the warewasher.

2. A method as defined in claim 1, wherein the time reference comprises a calendar date and a clock time that the unique ID assigned to the first rack was detected while being provided to the warewasher.

3. A method as defined in claim 1, further comprising:
repeating the reading and the communicating acts during the predetermined period of time such that the database stores a plurality of time references indicating times that the first rack was detected in the warewasher; and
accessing the database to determine a total number of instances that the first rack has been provided to the warewasher over the predetermined period of time.

4. A method as defined in claim 1, further comprising:
reading a unique ID for each of a plurality of subsequent racks as identification tags of the subsequent racks are detected while the subsequent racks are being provided to the warewasher after the first rack; and
communicating the unique ID's assigned to each of the plurality of subsequent racks to the remote computer for storage in the database in association with time references indicative of times during at which each of the plurality of subsequent racks were detected while being provided to the warewasher.

5. A method as defined in claim 4, further comprising:
analyzing the unique ID's stored in the database to determine a total number of instances that a particular rack is provided to the warewasher over the predetermined period of time.

6. A method as defined in claim 4, further comprising:
analyzing the unique ID's stored in the database to determine a total number of racks provided to the warewasher over the predetermined period of time.

7. A method as defined in claim 1, wherein the identification tag is a Radio Frequency Identification (RFID) tag and the reading acts comprises:
reading the unique ID assigned to the first rack using an RFID tag reader.

8. A method as defined in claim 1, further comprising:
analyzing the detected unique ID assigned to the first rack to determine a type of one or more articles placed in the first rack.

9. A method as defined in claim 1, wherein the identification tag for the first rack is affixed to an outer surface of the first rack.

10. A method as defined in claim 1, wherein the identification tag for the first rack is located within a molding of the first rack.

11. A method as defined in claim 1, wherein the time reference comprises a calendar date and a clock time that the unique ID assigned to the first rack was detected while being provided to the warewasher.

12. A computer program storage medium readable by a computing system and encoding a computer program for executing a computer process for monitoring operations of a warewasher over a predetermined period of time, wherein racks used to carry articles through the warewasher comprise an identification tag specifying a unique identifier assigned to each rack, the computer process comprising:
reading a unique ID assigned to a first rack as an identification tag of the first rack is detected while the first rack is being provided to the warewasher; and
communicating the unique ID assigned to the first rack to a remote computer for storage in a database in association with a time reference indicative of a time at which the first rack was detected while being provided to the warewasher.

13. A computer program storage medium as defined in claim 12, wherein the time reference comprises a calendar date and a clock time that the unique ID assigned to the first rack was detected while being provided to the warewasher.

14. A computer program storage medium as defined in claim 12, further comprising:
repeating the reading and the communicating acts during the predetermined period of time such that the database stores a plurality of time references indicating calendar dates and clock times that the first rack was detected in the warewasher; and
accessing the database to determine a total number of instances that the first rack has been provided to the warewasher over the predetermined period of time.

15. A computer program storage medium as defined in claim 12, further comprising:
reading a unique ID for each of a plurality of subsequent racks as identification tags of the subsequent racks are detected while the subsequent racks are being provided to the warewasher after the first rack; and
communicating the unique ID's assigned to each of the plurality of subsequent racks to the remote computer for storage in the database in association with time references indicative of times at which each of the plurality of subsequent racks were detected while being provided to the warewasher.

16. A computer program storage medium as defined in claim 15, further comprising:
analyzing the unique ID's stored in the database to determine a total number of instances that a particular rack is provided to the warewasher over the predetermined period of time.

17. A computer program storage medium as defined in claim 15, further comprising:
analyzing the unique ID's stored in the database to determine a total number of racks provided to the warewasher over the predetermined period of time.

18. A computer program storage medium as defined in claim 12, wherein the identification tag is a Radio Frequency Identification (RFID) tag and the reading act comprises:
reading the unique ID assigned to the first rack using an RFID tag reader.

19. A computer program storage medium as defined in claim 12, further comprising:
analyzing the detected unique ID assigned to the first rack to determine a type of one or more articles placed in the first rack.

20. A computer program storage medium as defined in claim 12, wherein the identification tag for the first rack is affixed to an outer surface of the first rack.

21. A computer program storage medium as defined in claim 12, wherein the identification tag for the first rack is located within a molding of the first rack.

22. A method for monitoring operations of a warewasher over a predetermined period of time, wherein one or more racks are used to carry one or more articles through the warewasher, the method comprising:
associating a unique identifier (ID) to each rack used to carry one or more articles through the warewasher, wherein each rack comprises an identification tag specifying the unique ID assigned to that rack;
receiving at a host computer a unique ID assigned to a first rack, the host computer operably coupled to a tag reader reading the identification tag to determine the unique ID assigned to the first rack while the first rack is being provided to the warewasher; and storing the unique ID assigned to the first rack in a database in association with a time reference indicative of a time that the first rack was detected while being provided to the warewasher.

23. A method as defined in claim 22, wherein the time reference comprises a calendar date and a clock time that the unique ID assigned to the first rack was detected while being provided to the warewasher.

24. A method as defined in claim 22, further comprising:

receiving at the host computer a unique ID assigned to each of a plurality of subsequent racks, wherein the tag reader reads identification tags included on each of the plurality of subsequent racks to determine the unique ID's assigned to the subsequent racks while the subsequent racks are being provided to the warewasher after the first rack; and storing the unique ID's assigned to each of the plurality of subsequent racks in the database in association with time references indicative of times that each of the plurality of subsequent racks were detected while being provided to the warewasher.

25. A method as defined in claim 24, further comprising:

analyzing the unique ID's stored in the database to determine a total number of instances that a particular rack is provided to the warewasher over the predetermined period of time.

26. A method as defined in claim 24, further comprising:

analyzing the unique ID's stored in the database to determine a total number of racks provided to the warewasher over the predetermined period of time.

27. A method as defined in claim 22, wherein the identification tag is a Radio Frequency Identification (RFID) tag and the tag reader is an RFID tag reader.

28. A method as defined in claim 22, further comprising:

analyzing the detected unique ID assigned to the first rack to determine a type of one or more articles placed in the first rack.

29. A method as defined in claim 22, wherein the identification tag for the first rack is affixed to an outer surface of the first rack.

30. A method as defined in claim 22, wherein the identification tag for the first rack is located within a molding of the first rack.

31. A computer program storage medium readable by a computing system and encoding a computer program for executing a computer process for monitoring operations of a warewasher over a predetermined period of time, wherein racks used to carry articles through the warewasher comprise an identification tag specifying a unique identifier assigned to each rack, the computer process comprising:

receiving at a host computer a unique ID assigned to a first rack, the host computer operably coupled to a tag reader reading the identification tag to determine the unique ID assigned to the first rack while the first rack is being provided to the warewasher; and storing the unique ID assigned to the first rack in a database in association with a time reference indicative of a time that the first rack was detected while being provided to the warewasher.

32. A computer program storage medium as defined in claim 31, wherein the time reference comprises a calendar date and a clock time that the unique ID assigned to the first rack was detected while being provided to the warewasher.

33. A computer program storage medium as defined in claim 31, further comprising:

receiving at the host computer a unique ID assigned to each of a plurality of subsequent racks, wherein the tag reader reads identification tags included on each of the plurality of subsequent racks to determine the unique ID's assigned to the subsequent racks while the subsequent racks are being provided to the warewasher after the first rack; and storing the unique ID's assigned to each of the plurality of subsequent racks in the database in association with time references indicative of times that each of the plurality of subsequent racks were detected while being provided to the warewasher.

34. A computer program storage medium as defined in claim 33, further comprising:

analyzing the unique ID's stored in the database to determine a total number of instances that a particular rack is provided to the warewasher over the predetermined period of time.

35. A computer program storage medium as defined in claim 33, further comprising:

analyzing the unique ID's stored in the database to determine a total number of racks provided to the warewasher over the predetermined period of time.

36. A computer program storage medium as defined in claim 31, wherein the identification tag is a Radio Frequency Identification (RFID) tag and the tag reader is an RFID tag reader.

37. A computer program storage medium as defined in claim 31, further comprising:

analyzing the detected unique ID assigned to the first rack to determine a type of one or more articles placed in the first rack.

* * * * *